United States Patent Office 3,409,598
Patented Nov. 5, 1968

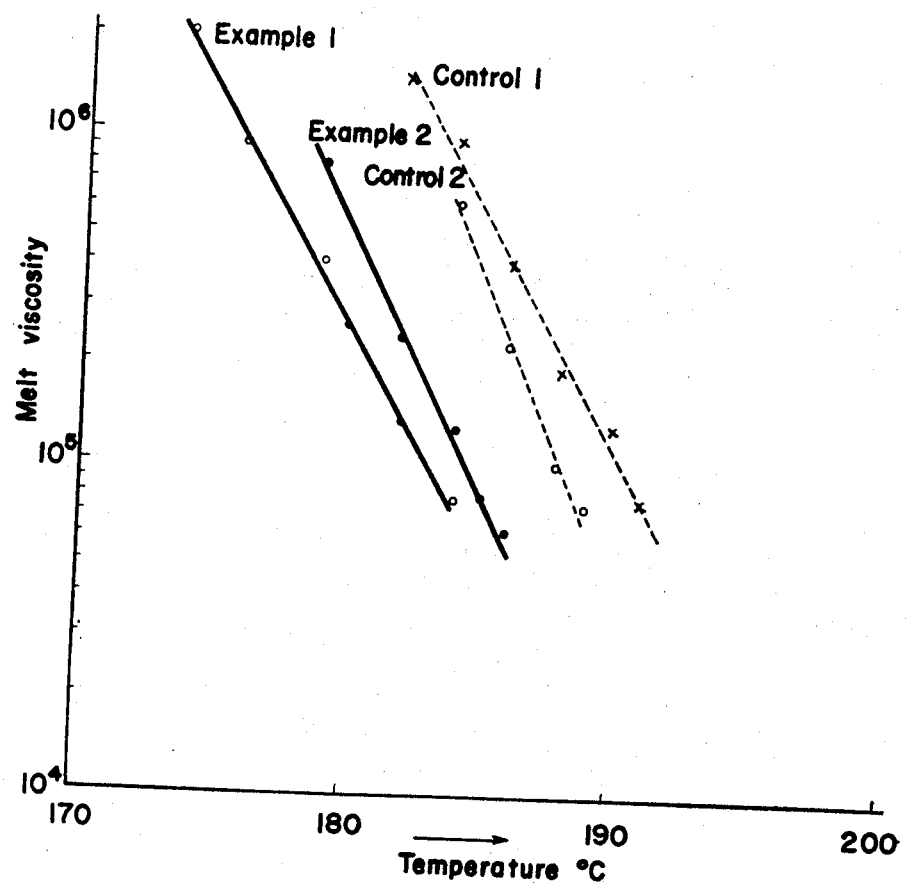

3,409,598
PROCESS FOR THE MANUFACTURE OF WATER SOLUBLE POLYVINYL ALCOHOL FILM
Bin Takigawa, Minoru Yoshida, Shigeto Miyoshi, and Hideyuki Tanaka, Tokyo, Japan, assignors to Denki Kagaku Kogyo Kabushiki Kaisha, Chiyoda-ku, Tokyo, Japan
Filed Mar. 1, 1965, Ser. No. 435,839
Claims priority, application Japan, June 18, 1964, 39/34,071
3 Claims. (Cl. 260—78.5)

ABSTRACT OF THE DISCLOSURE

A process for producing a water soluble film which comprises drying a modified and partially saponified polyvinyl alcohol obtained by saponifying polyvinyl acetate or vinyl acetate copolymerized with a small amount of acrylic, maleic, or itaconic acid or their esters or vinyl ethers in the presence of a polyhydric alcohol compatible with polyvinyl alcohol to such an extent that from 75 to 95 mol percent of acetic acid residue in 100 mols of said residue is substituted with hydroxyl groups. The final moisture content should be below 2%, and the polyvinyl alcohol is melt extruded in the form of small particles. The polyhydric alcohol should be added when polymerization or saponification takes place. By utilizing such a process, it is not necessary to remove large amounts of water, which is required in conventional processes.

---

This invention relates to a process for the manufacture of polyvinyl alcohol film easily soluble in cold water from a starting polyvinyl alcohol having a good thermoplasticity under a substantially anhydrous condition by a melt extrusion method.

In a conventional process for manufacturing polyvinyl alcohol (abridged as PVA hereinafter) film, an aqueous solution of PVA is extruded in a coagulating liquid and the film thus obtained is dried, or a process wherein an aqueous solution of PVA is cast on a flat and smooth surface uniformly and then heated to remove the moisture has been employed very often.

In manufacturing PVA film according to the conventional processes, it is necessary to remove a large amount of moisture so that it is not only disadvantageous economically but also the removal of moisture should take a long time resulting in the low ability of producing the film. Further, a considerable space is required for the apparatus and equipments and in particular, it is almost impossible to manufacture a cylindrical film and it is also difficult to manufacture a thick film in the manufacture of sheet film.

With regard to the extrusion molding of PVA it has been known that water and plasticizer are mixed with PVA to lower the melt viscosity of PVA and the mixture is subjected to the extrusion molding. In such case, however, in order to prevent the shrinkage after drying the film formed by adding water and after removing moisture, complicated processes such as heat treatment etc. are necessary and a high extrusion temperature at molding results in the foaming to make the molding of film impossible.

FIG. 1 shows the relationship between the melt viscosity of partially saponified polyvinyl alcohol according to the invention and the temperature.

According to the process of the invention, a PVA film can be manufactured under substantially anhydrous condition by the melt extrusion process without the necessity of adding water to PVA as in known processes, so that it is a very advantageous process from the point capable of omitting the drying process and heat treatment process of film and it will be explained in detail in the following:

The first feature of the invention is characterized in the use of a modified and partially saponified PVA obtained by saponifying polyvinyl acetate or its copolymer in the presence of polyhydric alcohol which is compatible with PVA, such as glycerin, 1,3-butanediol, ethylene glycol, diethylene glycol, triethylene glycol and polyethylene glycol, as different from a conventional perfect or partially saponified PVA. The partially saponified PVA used herein means a vinyl acetate polymer in which 75–95 mol percent of acetic acid residue in 100 mol of said residue is substituted by hydroxyl group.

It is necessary to add the polyhydric alcohol compatible with PVA in the case of single polymeriaztion or copolymeriaztion of vinyl acetate or in the case of saponification of polyvinyl acetate and copolymer. FIG. 1 shows the relation between the melt viscosity determined by KOKA flow tester and the temperature. The modified, partially saponified PVA is superior in its thermoplasticity to a conventional partially saponified PVA or a partially saponified PVA with which polyhydric alcohol is mixed after completing the saponification and filtration.

Vinyl acetate as starting material for said modified PVA may be polymerized alone or copolymerized with a small amount of polymerizable substance, such as acrylic, maleic and itaconic acid and their ester or vinyl ether to improve the plasticity.

The second feature of the invention is to perform the melt extrusion under a substantially anhydrous condition without adding water in performing a known melt extrusion of PVA. Since the melt extrusion is performed under anhydrous condition in the invention, the foaming resulted from water may be prevented and more especially, the operation is performed very easily when a cylindrical film is manufactured by an inflation method.

Since the melt extrusion is performed under anhydrous condition, the removal of moisture and heat treatment, which have been carried out in the former processes, for PVA after forming a film, are eliminated in the present process so that the process is very economical and advantageous.

It is important in forming a film that there is little amount of fish eyes in the film, the good transparency of film, the film is glossy and colorless and that the film has good elongation when coming out of a molding machine. The film obtained by the invention, however, is extremely superior to the film obtainable by a process as described in the control examples and its quality is equivalent or superior to that of film manufactured under the previous hydrous condition.

As a melt extruder to be used in the present process for molding film, in general any molding machine which is used for a thermoplastic resin such as polystyrene, polyethylene or polyvinyl chloride may be used. In the melt extrusion method, a modified and partially saponified PVA powder which has been previously dried thoroughly and is substantially anhydrous may be introduced into a melt extruder, formed to a sheet film depending on the shape of die of the extruder or to a cylindrical film by an inflation method, cooled to about room temperature, then wound up immediately.

While the invention is not limited by the molding condition, the temperature in melt extruder is preferably 170–220° C. and the foaming at high temperature as in the previous melt extrusion method for PVA is not observed.

Thus, since the melt extrusion may be performed so easily, polyhydric alcohol as plasticizer for PVA other than water may be added immediately before molding or the modified and partially saponified PVA powder may be pelleted and again melt extruded into a film.

Example 1

A mixed liquid of 9 parts of vinyl acetate, 1 part of ethylene glycol, 2 parts of methanol and 0.005 part of azobisisobutyronitrile was polymerized at a polymerization temperature of 65° C. for 8 hours and the vinyl acetate monomer was distilled off by a conventional process after the polymerization. A methanolic solution of the polymer of 45% concentration was then prepared and saponified with caustic soda of 1/200 equivalent per mol of vinyl acetate at a temperature of 25° C. to yield a modified and partially saponified PVA which has a polymerization degree of 950, a residual acetic acid residue of 12 mol percent and a melt viscosity of $10^5$ poises at 183° C. The modified PVA was vacuum dried in a vacuum drier at 60° C. and under a pressure of 10 mm. Hg for 12 hours to remove the moisture, then thrown into a test melt extruder which was heated at 180° C. and having 15 mm. screw diameter and 300 mm. length ($L/D=20$) under a substantially anhydrous condition at which the content of moisture is below 0.5% and molded at a rate of 200 g./hour from a ring die of 25 mm. diameter and 0.3 mm. clearance while blowing in inert gas to yield a colorless, transparent and tough cylindrical film having a diameter of about 50 mm. and containing little amount of fish eyes. The film was cooled to approximately ordinary temperature and directly wound up on a winder.

The molded film dissolved easily in cold water and the thickness, tensile strength and elongation were 0.02 mm., 4.0 kg./mm.$^2$ and 150% respectively.

Example 2

10% by weight, based on the weight of polyvinyl acetate, of 1,3-butanediol were added to a methanolic solution of polyvinyl acetate of 30% concentration, mixed homogeneously and saponified with caustic soda of 1/100 equivalent per mol of vinyl acetate at a temperature of 25° C. to yield a modified and partially saponified PVA having a polymerization degree of 1,070, a residual acetic acid residue of 11 mol percent and a melt viscosity of $10^5$ poises at 184.5° C. The modified PVA was molded by a melt extruder which was heated at 185° C. under a substantially anhydrous condition at which the content of moisture is below 0.5% to yield a colorless transparent and tough cylindrical film containing little amount of fish eyes.

Example 3

The same procedure as in Example 1 was repeated except for using diethylene glycol instead of ethylene glycol to yield a colorless, transparent and water soluble film.

Example 4

The same procedure as in Example 2 was repeated except for using polyethylene glycol (molecular weight 400) instead of 1,3-butanediol to yield a colorless, transparent and water soluble film.

Control 1.—A methanolic solution of polyvinyl acetate of 30% concentration was saponified with caustic soda of 1/200 equivalent per mol of vinyl acetate at a temperature of 25° C. to yield PVA having a polymerization degree of 1,070 and a residual acetic acid residue of 12 mol percent. The melt viscosity of this PVA showed $10^5$ poises at 191° C., which was dried in the same manner as in Example 1 and molded by means of a flat die and same die as in Example 1 from a melt extruder heated at 200° C. to yield a colored, dull and opaque film containing much fish eyes. The resulting product could be hardly used practically as film.

Control 2.—A methanolic solution of polyvinyl acetate of 30% concentration was saponified with 1/200 equivalent of caustic soda at a temperature of 25° C., after separation 1.0%, based on PVA, of 1,3-butanediol was added to the partially saponified, swelled PVA which was filtered (polymerization degree: 1,070, residual acetic acid residue: 12 mol percent) and dried in the same manner as in Example 1. The melt viscosity of this PVA showed $10^5$ poises at 188° C., which was molded through a flat die and same die as in Example 1 by means of a melt extruder heated at 195° C. to yield an opaque and colored film containing much fish eyes.

Control 3.—When a cylindrical film would be molded from PVA (polymerization degree: 950, residual acetic acid residue: 12 mol percent) manufactured in the same manner as in Example 1 by means of a melt extruder heated at 180° C. under a wet condition of 2% moisture while blowing in inert gas, a sufficient molding could not be performed by foaming.

By the comparison of films of PVA manufactured in the former examples with that in controls, it is evident that the film according to the invention is extremely excellent as shown in the following table.

TABLE

| | Melt extrustion temp. (° C.) | Elongation at molding | Surface of film | Transparency of film | Fish yes in the film | Color of film |
| --- | --- | --- | --- | --- | --- | --- |
| Example 1 | 180 | Good | Glossy | Transparent | Little | No. |
| Example 2 | 185 | do | do | do | do | No. |
| Control 1 | 200 | No | Dull and coarse | Opaque | Much | Pale yellow colored. |
| Control 2 | 195 | Somewhat good | Glossy | Somewhat opaque | do | Do. |

What we claim is:

1. A process for the manufacture of water soluble film which comprises drying a modified and partially saponified polyvinyl alcohol, which is obtained by saponifying a member selected from the group consisting of polyvinyl acetate and vinyl acetate copolymerized with a minor proportion of a monomer selected from the group consisting of acrylic, maleic and itaconic acids, their esters and vinyl ethers in the presence of polyhydric alcohol compatible with polyvinyl alcohol to such an extent that from 75 to 95 mol percent of the acetic acid in 100 mols of the acetic acid residue is substituted with hydroxyl groups, to a moisture content below 2%.

2. A process according to claim 1, which comprises polymerizing a member selected from the group consisting of vinyl acetate alone and vinyl acetate with a minor proportion of a monomer selected from the group consisting of acrylic, maleic and itaconic acids, their esters and vinyl ethers with the addition of polyhydric alcohol compatible with polyvinyl alcohol, saponifying the polymer or the copolymer to such an extent that from 75 to 95 mol percent of the acetic acid in 100 mols of the acetic acid residue is substituted with hydroxyl groups to yield a modified and partially saponified polyvinyl alcohol, drying said polyvinyl alcohol to a moisture content below 2% and melt extruding the same in the form of small particles.

3. A process according to claim 1, which comprises saponifying polyvinyl acetate and vinyl acetate copolymerized with a minor proportion of a monomer selected from the group consisting of acrylic, maleic and itaconic acids, their esters and vinyl ethers with the addition of polyhydric alcohol compatible with polyvinyl alcohol to such an extent that from 75 to 95 mol percent of the acetic acid in 100 mols of the acetic acid residue is substituted with hydroxyl groups, drying the resulting modified and partially saponified polyvinyl alcohol to a moisture content below 2% and melt extruding said polyvinyl alcohol in the form of powder and pellets.

References Cited

UNITED STATES PATENTS 2,386,347   10/1945   Roland _____ 260—85.7 XR

JOSEPH L. SCHOFER, *Primary Examiner.*

J. KIGHT, *Assistant Examiner.*